(12) United States Patent
Roche et al.

(10) Patent No.: US 7,988,938 B2
(45) Date of Patent: Aug. 2, 2011

(54) SELECTIVELY LEACHING COBALT FROM LATERITIC ORES

(75) Inventors: Eric Girvan Roche, Booragul (AU); Adam Sean Moroney, Fern Bay (AU); Houyuan Liu, Henderson, NV (US)

(73) Assignee: BHP Billiton SSM Development Pty Ltd. (AU)

( * ) Notice: Subject to any disclaimer, the term of this patent is extended or adjusted under 35 U.S.C. 154(b) by 0 days.

(21) Appl. No.: 12/746,641

(22) PCT Filed: Dec. 24, 2008

(86) PCT No.: PCT/AU2008/001908
§ 371 (c)(1),
(2), (4) Date: Jul. 16, 2010

(87) PCT Pub. No.: WO2009/079715
PCT Pub. Date: Jul. 2, 2009

(65) Prior Publication Data
US 2010/0296988 A1 Nov. 25, 2010

(30) Foreign Application Priority Data
Dec. 24, 2007 (AU) .............................. 2007907098

(51) Int. Cl.
*C01G 45/00* (2006.01)

(52) U.S. Cl. ........ 423/49; 423/150.1; 423/139; 423/140
(58) Field of Classification Search .............. 423/49, 423/150.1, 140, 139
See application file for complete search history.

(56) References Cited

U.S. PATENT DOCUMENTS

| 4,464,348 A | 8/1984 | Burba, III |
|---|---|---|
| 6,171,564 B1 | 1/2001 | Jones |
| 6,524,367 B1 | 2/2003 | Castellanos Suarez et al. |
| 2003/0075021 A1* | 4/2003 | Young et al. .................... 75/743 |

FOREIGN PATENT DOCUMENTS

| EP | 1731623 | 12/2006 |
|---|---|---|
| SU | 1200580 | 1/1996 |
| WO | WO98/37247 | 8/1998 |
| WO | WO 2006053376 A1 * | 5/2006 |
| WO | WO2007/092994 | 8/2007 |

* cited by examiner

*Primary Examiner* — Melvin Mayes
*Assistant Examiner* — Melissa Stalder
(74) *Attorney, Agent, or Firm* — Brinks Hofer Gilson & Lione; G. Peter Nichols

(57) ABSTRACT

A heap leach process for the recovery of nickel and cobalt from a lateritic ore, said process including the steps of leaching and/or agglomerating the ore with a lixiviant that includes ferrous ions, wherein the lixiviant is able to liberate cobalt from the cobalt containing minerals within the ore in preference to nickel, to produce a cobalt rich pregnant leach solution relatively free of nickel.

17 Claims, 4 Drawing Sheets

SELECTIVELY LEACHING COBALT FROM LATERITIC ORES

This application claims priority to PCT Application Serial No. PCT/AU2008/001908 filed Dec. 24, 2008 published in English on Jul. 2, 2009 as PCT WO 2009/079715 and to Australian Application No. 2007/907098 filed Dec. 24, 2007, the entire contents of each are incorporated herein by reference.

INTRODUCTION

The present invention relates to a process for the selective leaching of cobalt and nickel from lateritic ore that contains at least cobalt and nickel. The invention particularly relates to a process where a lateritic ore is heap leached with a lixiviant which includes ferrous ions.

In one embodiment, the applicants have found that cobalt can be selectively liberated from the cobalt containing minerals within a laterite ore where the lixiviant includes ferrous ions. In a further embodiment incorporating this concept, the applicants have found that both cobalt and nickel can be selectively and/or sequentially recovered from a laterite ore by first selectively leaching cobalt by utilising a weakly acidic solution containing ferrous ions, and then leaching the heap with a stronger acid solution to liberate the nickel from nickel containing minerals. This process provides for an alternative means by which the nickel and cobalt can be separately recovered from a laterite ore during a heap leach process without, or with reduced need to separate the nickel and cobalt by downstream separation techniques.

BACKGROUND OF THE INVENTION

Laterite ores are potentially the world's largest source of nickel and cobalt. In general, most deposits of nickel/cobalt laterites contain three major zones based on morphology, mineralogy and chemical composition. These three zones, from the base to the surface, atop weathered parent bedrock materials are the saprolite zone, the transition zone and the limonite zone. There is generally a large variation in total thickness of the laterite deposit, as well as individual zone thickness.

The saprolite zone consists predominantly of "saprolitic serpentine" minerals and a large variety of nickel/magnesium silicate minerals. The weathering process, or "serpentinization" of the parent bedrock material is characterised by a decrease in the magnesium content and an increase in the iron content of the top layer of ore body. The resulting saprolite zone contains between 0.5% and 4% nickel and a higher magnesium content, which is normally over 6% wt. Saprolite contains less cobalt. The Co/Ni weight ratio of saprolite is normally less than 1:10.

The not well defined transition zone is composed essentially of limonite and saprolite. It also commonly contains nickel in the range of from 1.0% to 3.0% with co-existing cobalt ranging from 0.08% up to 1%. Cobalt is generally associated with asbolane, a hydrated manganese oxide.

The limonite zone, located on the top zone of lateritic ore body, contains nickel ranging from about 0.5% to 1.8% and consists of goethite-rich and/or hematite rich ore, which is rich in iron and cobalt. Therefore the cobalt value of a lateritic ore body is mostly recovered from limonitic and transition zone. It has a lower magnesium content than saprolitic type ore. Due to stronger weathering, limonitic ore contains dominantly fine and soft particles of goethite and/or hematite. Sometimes the weathering has not been fully completed and either the hematite or the goethite rich sections are not present. Alternatively, depending upon the climatic condition, the limonite zone will still contain residual iron/aluminium silicates, such as nickel-containing smectite, nontronite and chlorite.

It has been found that the permeability of lateritic ore is largely controlled by the type of mineral occurrence, mineral morphology and particle size. Although the mineralogy of lateritic ore is rather complex and widely variable from deposit to deposit, there is some commonality or similarity of mineral morphology in the worldwide lateritic nickel deposits. These morphological structures enhance permeability of solution and preserve physical stability of individual minerals.

Heap leaching of nickeliferous oxidic ore has been proposed in recovery processes for nickel and cobalt and is described, for example in U.S. Pat. Nos. 5,571,308 and 6,312,500, both in the name of BHP Minerals International Inc.

U.S. Pat. No. 5,571,308 describes a process for heap leaching of high magnesium containing laterite ore such as saprolite. The patent points out that the fine saprolite exhibits poor permeability, and as a solution to this, pelletisation or agglomeration of the ore is necessary to ensure distribution of the leach solution through the heap.

U.S. Pat. No. 6,312,500 also describes a process for heap leaching of laterites to recover nickel, which is particularly effective for ores that have a significant clay component (greater than 10% by weight). This process includes sizing of the ore where necessary, forming pellets by contacting the ore with a lixiviant, and agglomerating. The pellets are formed into a heap and leached with sulfuric acid to extract the metal values. Sulfuric acid fortified seawater may be used as the leach solution.

International application PCT/AU2006/000606 (in the name of BHP Billiton SSM Technology Pty Ltd) also describes a process where nickeliferous oxidic ore is heap leached using an acid supplemented hypersaline water as the lixiviant with a total dissolved solids concentration greater than 30 g/L in order to leach the heap.

Heap leaching laterites offers the promise of a low capital cost process, eliminating the need for expensive and high maintenance, high pressure equipment required for conventional high pressure acid leach processes.

Generally, in a heap leach process of laterites, a relatively strong acidic lixiviant is used to liberate both the cobalt and nickel from the cobalt and nickel containing ores. With laterite ores predominantly consisting of saprolitic type ores, the nickel is generally associated with saprolitic serpentine minerals and nickel/magnesium silicate minerals. In limonitic ore the nickel is generally associated with the iron containing minerals such as goethite. Cobalt is commonly associated with hydrous manganese oxides, such as asbolane, in both saprolitic and limonitic ore. Generally, in heap leaching processes, the lixiviant is a relatively high strength acidic solution that liberates both the nickel and cobalt from the respective minerals within the laterite ore.

The leachate will generally include dissolved nickel and cobalt together with other dissolved impurities and in order to recover the nickel and cobalt, separation techniques such as sulfide or hydroxide precipitation, solvent extraction or ion exchange need to be employed to separate the nickel and cobalt. The present invention aims to develop a heap leach process where the nickel and cobalt can be at least partially separated as part of the leaching process to obtain the PLS (pregnant leachate solution) with higher cobalt/nickel concentration ratio than the cobalt/nickel concentration ratio of ore, which obviates or reduces the need for downstream separation techniques.

A reference herein to a patent document or other matter which is given as prior art is not to be taken as an admission that that document or matter was known or that the information it contains was part of the common general knowledge as at the priority date of any of the claims.

BRIEF DETAILS OF THE INVENTION

The present invention relates to a heap leach process where the lixiviant is a solution that includes ferrous ions. The lixiviant is preferably an acidic solution most preferably a sulfuric acid solution. The applicants have found that the inclusion of ferrous ions enables the lixiviant to selectively liberate the cobalt contained in cobalt containing minerals associated with both limonitic and saprolitic type ores. The level of ferrous ions used can vary depending on the manganese level within the minerals. In general, it has been found that the higher the manganese levels, the more ferrous that is needed. Only low levels of ferrous is needed to liberate cobalt from the cobalt containing ores, such as asbolane.

Asbolane is a mixed oxide of cobalt and manganese. Asbolane also includes some nickel, however the absolute amount of nickel contained in asbolane within the ore is small compared to the nickel contained in other minerals such as goethite and serpentine within the ore. The process therefore provides a means to selectively leach cobalt in preference to the majority of the nickel from a lateritic ore in a heap leach process, particularly where the asbolane and other such oxidised cobalt/manganese minerals primarily contain only limited amounts of nickel.

Accordingly, in the first embodiment of the present invention there is provided a heap leach process for the recovery of nickel and cobalt from a lateritic ore, said process including the steps of leaching and/or agglomerating the ore with a lixiviant that includes ferrous ions, wherein the lixiviant is able to liberate cobalt from the cobalt containing minerals within the ore in preference to nickel, to produce a cobalt rich pregnant leach solution relatively free of nickel.

The laterite ore may be either predominantly limonite or saprolite, or a combination of both.

The ratio of cobalt to nickel in the cobalt containing leachate is significantly in favour of cobalt compared to leaching the ore without the ferrous ion reducing agent. The ratio of cobalt to nickel may still be in the order of about 1:1, or even slightly in favour of nickel, but this is in contrast to a cobalt to nickel ratio of say 1:30 which may occur with a lixiviant that doesn't target the cobalt containing minerals.

The applicants have found that a lixiviant that includes ferrous ions is able to liberate cobalt from cobalt containing minerals such as asbolane and other oxidised cobalt/manganese minerals associated with both the limonitic and saprolitic components of a laterite ore, while leaving the majority of the nickel, in particular, still entrained within the ore. Most preferably the lixiviant includes ferrous sulfate.

The applicants have found that utilising a lixiviant that includes ferrous sulfate can lead to an effective means to separate nickel from cobalt in a heap leach process. It has further been found that cobalt can be leached with an acidic lixiviant that has a lower acidity than is required in order to leach nickel. For example, the lixiviant may have a pH in the range of about 4-6.5 and still liberate cobalt from the cobalt containing minerals while leaving the nickel entrained within the ore.

The applicants have found that, in order to recover cobalt from the heap, only a limited amount of acidic solution to react with the cobalt containing ores is needed because the leaching kinetics of cobalt is more dependent on reduction conditions than acidity. This reduces the amount of acidic solution used which minimises the leaching of impurities. Further, the iron that may be present as ferrous sulfate in the lixiviant is converted to ferric sulfate during the leach step, which may be precipitated in the heap through the action of alkaline minerals such as magnesite, calcite or dolomite. This will produce a relatively pure cobalt pregnant leach solution substantially free of iron and other impurities.

The main nickel containing minerals, such as serpentine, require a pH of below 4 in order to liberate the nickel from the minerals. Accordingly, the applicants have found that a process could be developed to allow for adequate separation of cobalt and nickel during the leach process by applying suitable lixiviants to separately or sequentially leach the cobalt and nickel.

Accordingly, in a second embodiment to the invention, there is provided a heap leach process for the sequential and/or selective recovery of cobalt and nickel from a lateritic ore, said process including the steps of:
  a) providing at least one heap of a lateritic ore containing at least nickel and cobalt;
  b) treating the heap in a pre-leach step with a weakly acidic lixiviant containing ferrous ions to selectively liberate cobalt from the cobalt containing minerals within the ore, to produce a cobalt rich product liquor relatively free of nickel; and
  c) leaching the heap with a stronger acid solution to leach nickel from the nickel containing minerals, to produce a nickel rich pregnant leach solution relatively free of cobalt.

The cobalt rich pregnant leach solution may still include a cobalt to nickel ratio of about 1:1, or even slightly in favour of nickel but by selectively liberating cobalt containing minerals. A relatively cobalt rich pregnant leach solution will be produced which is suitable for downstream processing. Both the cobalt rich and nickel rich pregnant leach solutions may be used for the production of products with differing cobalt to nickel weight ratios.

The respective nickel and cobalt containing pregnant leach solutions may be treated separately in order to recover the nickel and cobalt by standard processes including sulfide and hydroxide precipitation, solvent extraction, ion exchange, electrowinning or other known processes.

BRIEF DESCRIPTION OF THE DRAWINGS

FIG. 3 shows a graph demonstrating cobalt extraction against acid consumption, while

DETAILED DESCRIPTION OF THE INVENTION

The detailed description of the invention will be described with reference to FIGS. 1 to 4. It should be kept in mind, that these figures are illustrative of a preferred embodiment of the invention, and that the invention should not be considered to be limited thereto.

Figure 1:
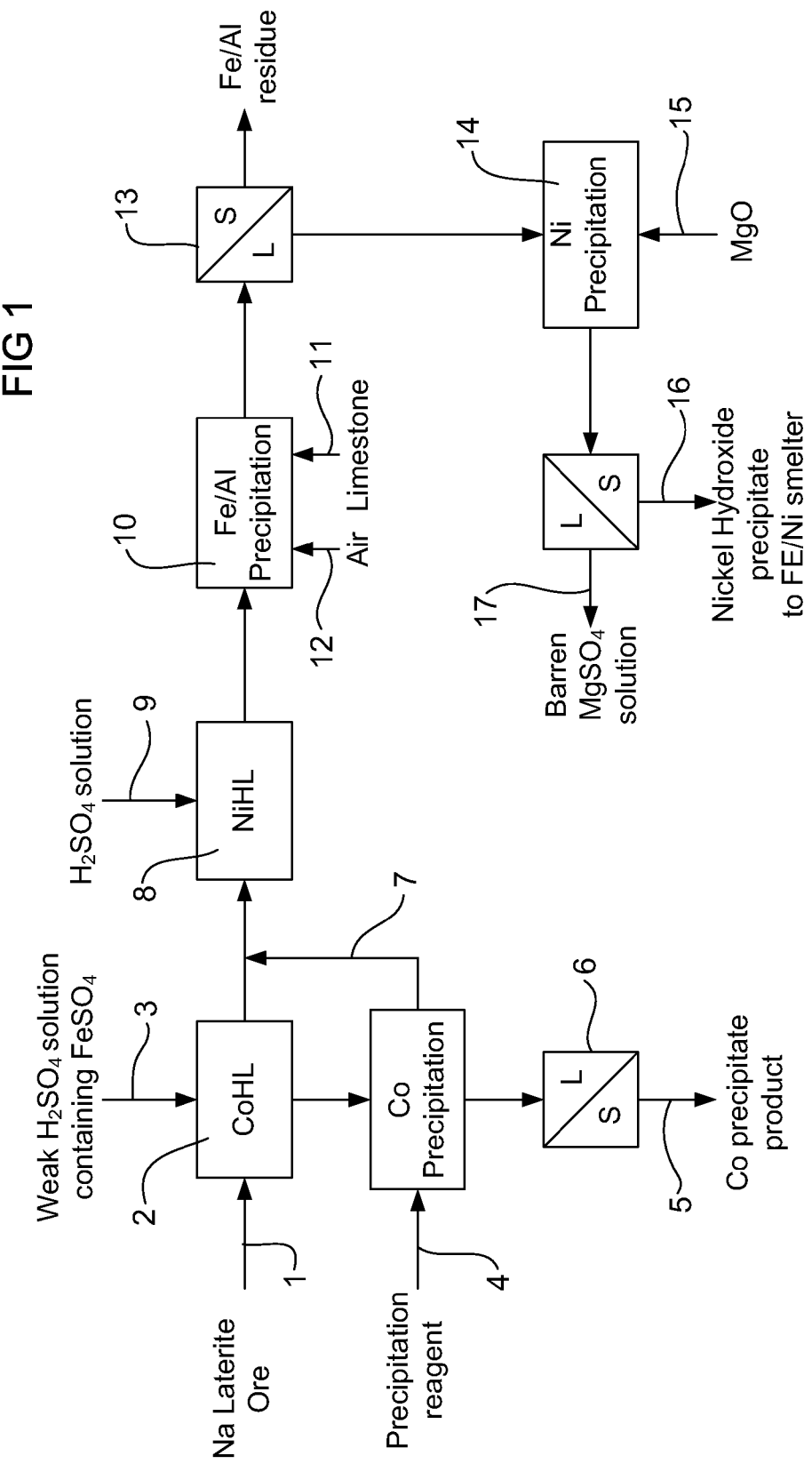
FIG. 1 shows an example of a flow sheet where cobalt and nickel are sequentially leached from a lateritic ore.

In FIG. 1, a lateritic ore (1) is formed into at least one heap (2) that includes at least cobalt and nickel. Other heaps may be formed so the process could operate in a counter current manner. Cobalt may be selectively leached from the heap by applying a lixiviant which comprises a weak acid solution together with ferrous sulfate (3).

The weakly acidic solution is generally a sulfuric acid solution. In one example, the acid may have a pH in the order of about 4-6.5. The acid may also be selected from other mineral acids such as hydrochloric or nitric acid.

The weakly acidic solution containing the ferrous sulfate is able to liberate cobalt from cobalt containing minerals generally associated with both limonitic and saprolitic fractions of a laterite ore, including asbolane and other similar cobaltiferous manganese oxyhydroxides such as lithiophorite, hollandite, cryptomelane, psilomelane, pyrolusite and todorokite. The cobalt leaching process only requires sufficient acid to react with this small amount of cobalt containing mineral present, which minimizes impurity leaching. A part of the required acid may be provided in-situ by the $FeSO_4$, which forms iron hydroxide and acid after being oxidised. The reactions for the cobalt leach where a lixiviant containing ferrous sulfate is used are as follows:

$$(Co, Mn)O_2 + xH_2SO_4 + FeSO_4 \rightarrow CoSO_4 + MnSO_4 + Fe_2(SO_4)_3 + xH_2O$$

$$Co_3O_4 + 2FeSO_4 + 4H_2SO_4 \rightarrow 3CoSO_4 + Fe_2(SO_4)_3 + 4H_2O$$

$$MnO_2 + 2FeSO_4 + 2H_2SO_4 \rightarrow MnSO_4 + Fe_2(SO_4)_3 + 2H_2O$$

$$Fe_2(SO_4)_3 + 3H_2O \rightarrow Fe(OH)_3 + 3H_2SO_4$$

The reaction will also produce ferric sulfate and minor amounts of manganese sulfate together with cobalt sulfate. The ferric sulfate can be caused to precipitate in the heap, as shown, leaving a cobalt and manganese containing pregnant leach solution that is substantially free of iron and other impurities. When the ferrous ions are present as ferrous sulfate, it will precipitate from the heap as solid ferric containing minerals and may be separated from the cobalt containing pregnant leach solution, and little, if any iron will be leached into the resultant pregnant leach solution. By this means, iron can be removed as a solid waste product, and little, if any iron will be leached into the resultant pregnant leach solution.

Sufficient acid may be made available entirely from the $FeSO_4$, in the manner of the above reactions, or may be supplied in the leach solution. Accordingly, it is possible that no acid need be added to the ferrous lixiviant.

The cobalt-rich pregnant leach solution may then be treated separately to recover the cobalt, depending on the desired use for the cobalt. For example, the relatively iron free cobalt solution may be treated to recover the cobalt without additional impurity removal steps. The cobalt may be precipitated by the addition of a precipitation agent (4). For example, if the cobalt was to be precipitated as a sulfide, a sulfur-containing compound such as sodium hydrosulfide or hydrogen sulfide may be added. If the cobalt was to be precipitated as an hydroxide, an oxidising agent such as magnesium oxide may be added. The precipitation conditions may be adjusted to selectively separate the cobalt from the manganese, or the cobalt and manganese may be precipitated together. Nickel, if present in the solution would also precipitate with the cobalt.

The cobalt precipitate product (5) is recovered, following a solid/liquid separation step (6). The solid cobalt rich precipitate (5) may then be recovered and sold as an intermediate for other purposes for example, sold directly to a refiner to produce a purified cobalt product, or further processed to other cobalt containing products as may be desired. The spent solution (7) after cobalt precipitation may be recycled for further cobalt leaching or sent to a nickel leaching step or discarded.

In the second embodiment of the invention, nickel is also recovered from the heap (8) by applying a more concentrated sulfuric acid solution (9) at a pH of below 4, which will liberate nickel from nickel containing minerals such as serpentine. The lixiviant may be a combination of recycled acid solution from the cobalt precipitation step (7) together with fresh concentrated sulfuric acid solution (9).

The resultant nickel containing solution (10) will contain almost no cobalt or manganese, but will include other impurities such as iron and aluminium. These impurities may be separated from the solution by the addition of a base such as limestone (11), together with an injection of air, which will assist in precipitating the iron in particular. The iron and aluminium may be discarded as a solid waste following a solid/liquid separation step (13).

The nickel containing solution, now free of impurities such as iron and aluminium, can then be subjected to a precipitation step (14) by the addition of magnesium oxide (15) or other suitable alkali which will precipitate nickel as an hydroxide (16). Alternatively, the nickel could be recovered as a sulfide by the addition of a sulfiding agent such as sodium hydrosulfide or hydrogen sulfide, or recovered by other means such as solvent extraction or ion exchange depending on the final intended use for the nickel product. The barren magnesium sulfate solution (17) is discarded to waste ponds.

The nickel product (16), which is low in cobalt and manganese, may therefore be further processed without concern for loss of cobalt values.

Figure 2:
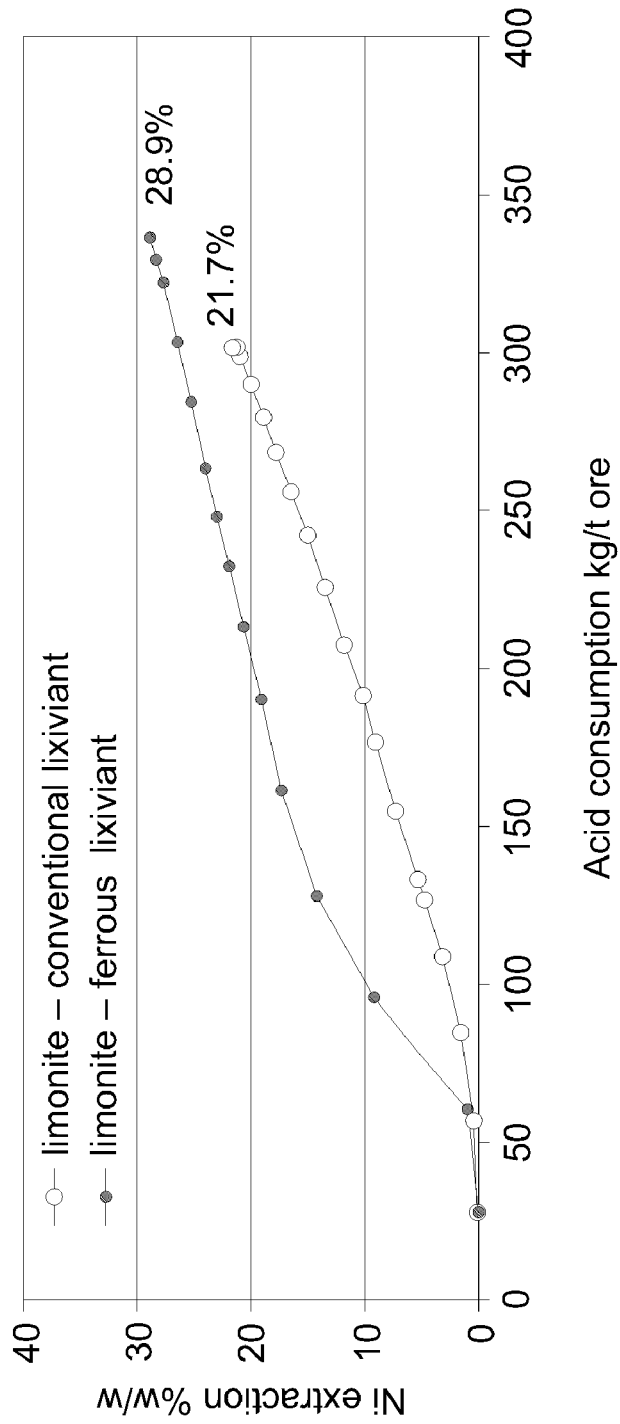
FIG. 2 shows a graph demonstrating the nickel extraction against acid consumption in a heap that is predominantly limonite.

FIG. 2 shows the comparison of nickel extraction in a limonite leach with the use of a conventional sulfuric acid lixiviant compared to the use of a lixiviant that includes a ferrous ion. The results show a slight increase in the nickel value recovered with the use of a ferrous ion.

Figure 3:
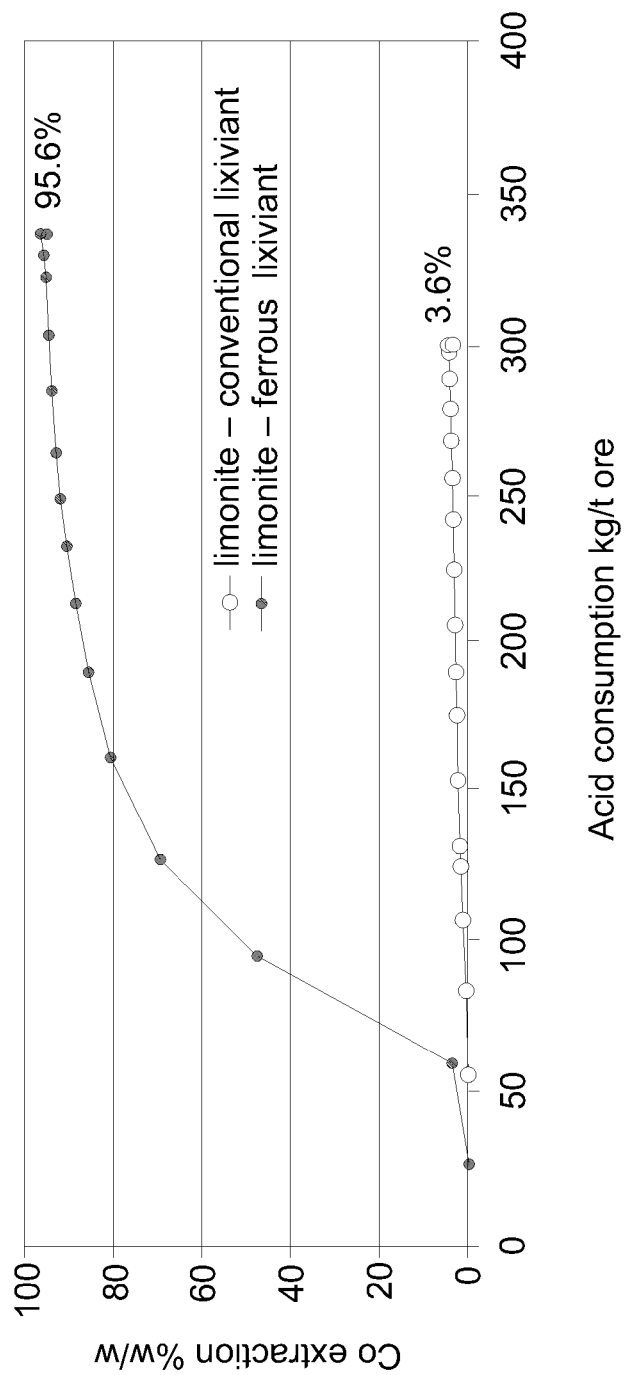
Figure 4:
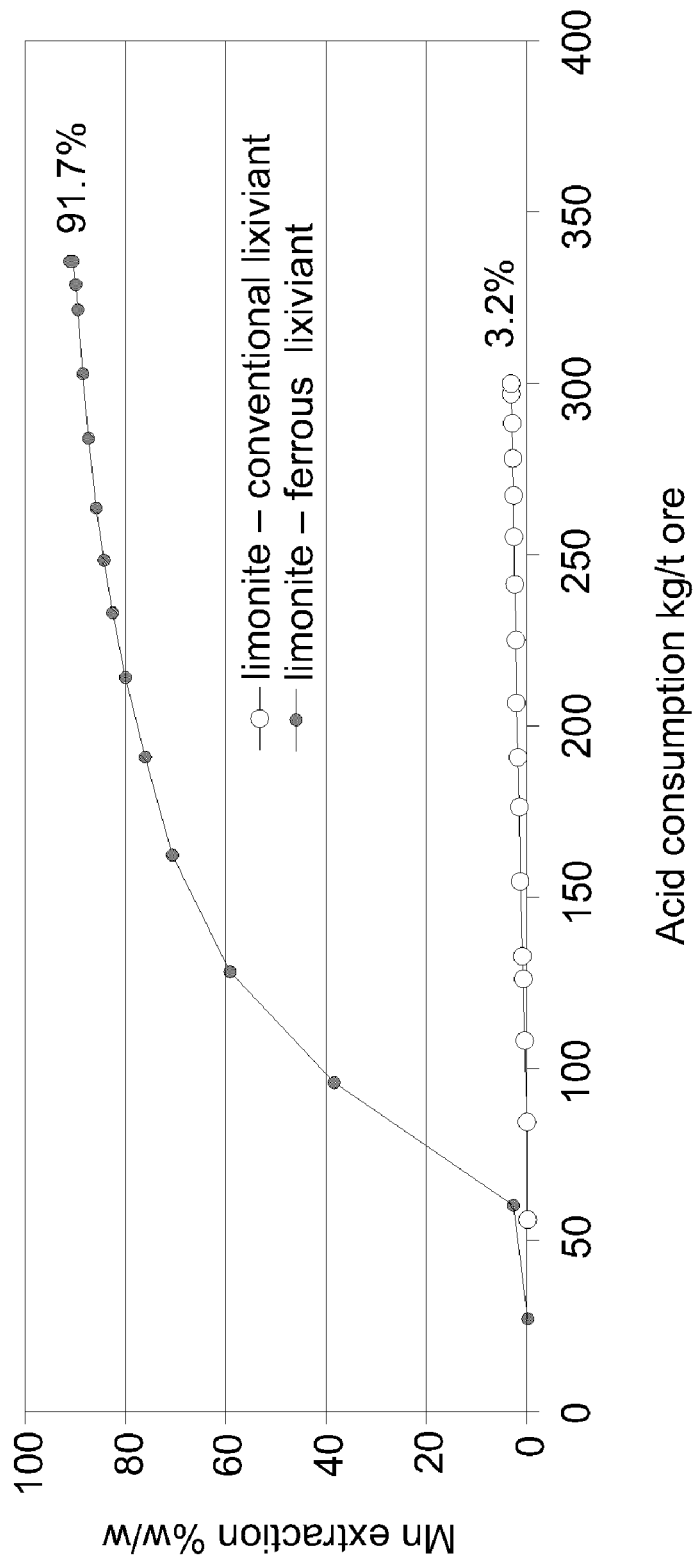
FIG. 4 shows manganese extraction of the same heap shown in FIG. 3.

FIGS. 3 and 4 show that when a ferrous lixiviant is used in a limonite leach, greater than 90% of the cobalt and manganese is extracted, while less than 4% of the cobalt and manganese is extracted with the use of conventional sulfuric acid lixiviant.

The process of the present invention provides for an effective means by which nickel and cobalt can be separated in a heap leach process substantially without the need to subject the pregnant leach solution to nickel and cobalt separation processes.

Further, the process provides the advantage that a relatively pure cobalt solution, free from iron impurities can be produced.

In like vein, the process provides the advantage that a relatively pure nickel solution can be produced effectively free from cobalt and manganese, and can thereby produce a nickel containing product which requires no further separation processes to recover or remove cobalt and manganese.

The invention described herein is susceptible to variations, modifications and/or additions other than those specifically described and it is to be understood that the invention includes all such variations, modifications and/or additions which fall within the spirit and scope of the above description.

The claims defining the invention are as follows:

1. A heap leach process for the recovery of nickel and cobalt from a lateritic ore, said process including the step of leaching or agglomerating the ore with a lixiviant that includes ferrous ions, wherein the lixiviant is able to liberate cobalt from the cobalt containing minerals within the ore in preference to nickel, to produce a cobalt rich pregnant leach solution relatively free of nickel.

2. A process according to claim 1 wherein the lixiviant is an acidic lixiviant.

3. A process according to claim 1 wherein the ferrous ions present as ferrous sulfate.

4. A process according to claim 1 wherein the cobalt rich pregnant leach solution contains at least leached cobalt and manganese.

5. A process according to claim 1 wherein acid is produced in situ from the ferrous ion, to fulfil part or all of the acid required to liberate cobalt from the cobalt containing minerals.

6. A process according to claim 1 wherein the lixiviant includes sulfuric acid.

7. A heap leach process for the sequential or selective recovery of cobalt and nickel from a lateritic ore, said process including the steps of:
   a) providing at least one heap of a lateritic ore containing at least nickel and cobalt;
   b) treating the heap in a pre-leach step with a weakly acidic lixiviant containing ferrous ions, to selectively liberate cobalt from the cobalt containing minerals within the ore, to produce a cobalt rich pregnant leach solution relatively free of nickel; and
   c) leaching the heap with a stronger acid solution to leach nickel from nickel containing minerals, to produce a nickel rich pregnant leach solution relatively free of cobalt.

8. A process according to claim 7 wherein manganese and ferric ions are also leached from the heap in the pre-leach step, together with the cobalt.

9. A process according to claim 7 wherein the ferrous ions are present as ferrous sulfate.

10. A process according to claim 7 wherein the pH of the weakly acidic lixiviant is from about 4 to about 6.5.

11. A process according to claim 7 wherein the pH of the stronger acid solution is below 4.0.

12. A process according to claim 8 wherein the ferric ions are precipitated and disposed of as waste solid, leaving cobalt and manganese in the cobalt rich pregnant leach solution substantially free of iron.

13. A process according to claim 12 wherein the cobalt is separately recovered from the manganese in the cobalt rich pregnant leach solution, for use in the production of a high grade cobalt product.

14. A process according to claim 7 wherein the cobalt rich pregnant leach solution and the nickel rich pregnant leach solution are processed separately for nickel and cobalt recovery.

15. A process according to claim 14 wherein the cobalt and nickel are recovered from the cobalt and nickel containing pregnant leach solutions respectively, by either sulfide or hydroxide precipitation, ion exchange, solvent exchange or electrowinning.

16. A heap leach process for the recovery of nickel and cobalt from a raw lateritic ore comprising, leaching or agglomerating the raw ore with a lixiviant that includes exogenous ferrous ions, wherein the lixiviant liberates cobalt within the ore in preference to nickel, to produce a cobalt rich pregnant leach solution relatively free of nickel.

17. The heap leach process of claim 16 wherein the lixiviant contains sulfuric acid and the lixiviant has a pH from about 4 to about 6.5.

* * * * *